March 18, 1952 E. A. WEIDENMILLER 2,589,908
EMBOSSING CUTTER FOR CRACKERS AND BISCUIT
CUTTING AND EMBOSSING MACHINES
Filed Sept. 12, 1950 2 SHEETS—SHEET 1

INVENTOR.
EDWARD A. WEIDENMILLER
BY
ATTORNEY

March 18, 1952  E. A. WEIDENMILLER  2,589,908
EMBOSSING CUTTER FOR CRACKERS AND BISCUIT
CUTTING AND EMBOSSING MACHINES
Filed Sept. 12, 1950  2 SHEETS—SHEET 2

INVENTOR.
EDWARD A. WEIDENMILLER
BY Ferd Bing
ATTORNEY

Patented Mar. 18, 1952

2,589,908

UNITED STATES PATENT OFFICE 2,589,908

EMBOSSING CUTTER FOR CRACKERS AND BISCUIT CUTTING AND EMBOSSING MACHINES

Edward A. Weidenmiller, Lincolnwood, Ill., assignor to Edward Weidenmiller Co., Inc., Morton Grove, Ill., a corporation of Illinois Application September 12, 1950, Serial No. 184,379

1 Claim. (Cl. 107—26)

This invention relates to cutters for crackers, cookies and the like, and particularly to such embossing cutters of the kind that are used in cookie and cracker cutting and embossing machines in relatively large bakeries to both cut and emboss cookies or crackers.

In such cracker and cookie cutting and embossing machines, a continuous sheet of dough is advanced on a belt through a cutting station in the machine at which a vertically reciprocable cutting or forming die is moved up and down at a relatively rapid rate so as to cut a relatively larger number of crackers or cookies in each vertical movement of the cutting die. Where such machines have been used for forming embossed crackers or cookies, a two-cycle cutting and forming operation is in some instances utilized wherein an embossed pattern is placed upon the dough at one position of the sheet and in which the crackers are cut in the next station or position. Still further, such embossing, cutting machines may, in some instances, be arranged to afford an embossed cracker or cookie through the performance of cutting and embossing operations in succession but at the same position of the dough sheet. The present invention relates in particular to embossing cutters, for it is found in the industry that there are many objections to the prior methods and structures employed in producing embossed crackers or cookies. For example, it is found that where the steps of embossing and cutting are performed at successive stations, accurate registry of the embossed pattern with the cookie outline is difficult to attain, and the production rate of the machine is objectionably reduced. Similarly, where cutting and embossing have been performed at the same station or dough position, it is more difficult to set up the machine, and a special and more expensive machine is required which embodies a separate actuating means for the embossing plate embodied in prior embossing cutters. It is, therefore, an important object of the present invention to enable embossing cutters to be so constructed and arranged that the functions of embossing and cutting may be attained at the same station or dough position in a simple machine that ordinarily could not be used for embossing without reduction of output. A further and related object of the present invention is to enable the single reciprocating motion of an ordinary cracker or cookie cutting machine to be utilized to perform the embossing as well as the cutting operations at a single station or dough position so as to thereby enable a completely cut and embossed cracker or cookie to be formed at each possible cutter location in each reciprocation of the machine head.

Another and more specific object of the present invention is to simplify the formation and structure of embossing cutters for use in cookie and cracker cutting machines, and to accomplish this in such a way that the structure may readily be adjusted for embossing on dough sheets of different thicknesses.

Other and further objects of the present invention will be apparent from the following description and claim and are illustrated in the accompanying drawings, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claim.

Figure 1:
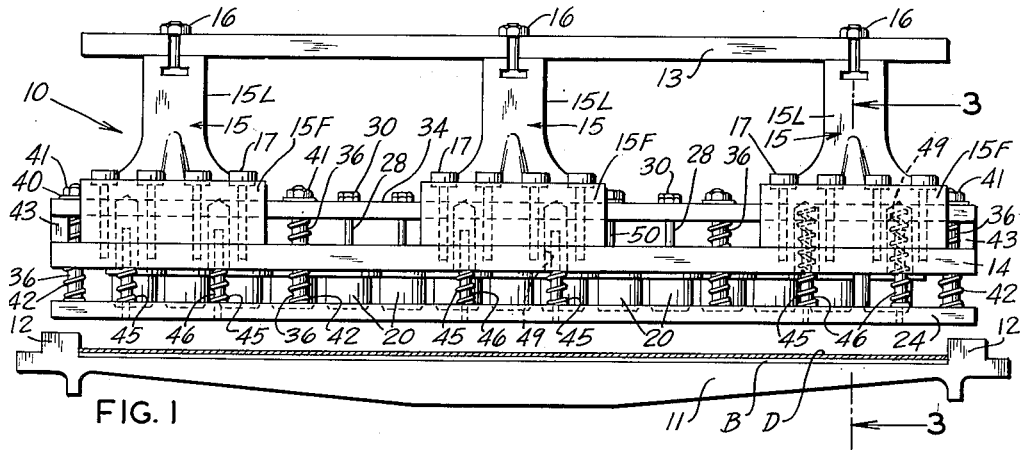
Fig. 1 is a front elevational view of an embossing cutter unit embodying the invention.

For purposes of disclosure, the invention is herein illustrated as embodied in a cutting unit 10 adapted for performance of cracker or cookie cutting and embossing operations so as not only to cut crackers or cookies from a dough sheet but also to emboss a pattern on the upper faces of such crackers or cookies. The unit 10 embodies certain basic elements that correspond in name and general function with elements embodied in prior embossing cutters, and it should be observed that the present invention resides in the form, construction, relationship and operational features, as well as in the simplicity of these elements, as will be described in detail after the various elements have been identified and described in a general manner. The embossing cutter of the invention is adapted for mounting and use in the conventional single-action cracker cutting machine in which a cutting bed plate 11 is arranged to have a dough sheet D drawn or advanced longitudinally thereof on an endless belt B between spaced striker bars 12 that are afforded along opposite sides of a cutting and forming station in the machine. Such cutting and forming station is, in such conventional machines, defined in part by a vertically reciprocable horizontal mounting bar 13 which serves to support and operate the forming means, such as the cutting unit 10 that is constructed in accordance with the present invention.

It will be observed that the unit 10 embodies a rectangular bolster plate 14 that is supported on and beneath the actuating bar 13 by a plurality of mounting arches 15 that are connected at their upper ends to the bar 13 by means such as bolts 16. The arches 15 are disposed at points spaced longitudinally of the bolster plate 15, and each arch 15 comprises a horizontal upper bar portion 15T, from the ends of which force transmitting legs 15L extend downwardly and outwardly so as to terminate in enlarged connecting feet 15F that are disposed over and adjacent to opposite border or side edge portions of the bolster plate 14, to which such connecting feet 15F are respectively secured by a plurality of Allen head cap screws 17 that extend downwardly through the feet 15F and into tapped relation with the bolster plate 14.

Figure 6:
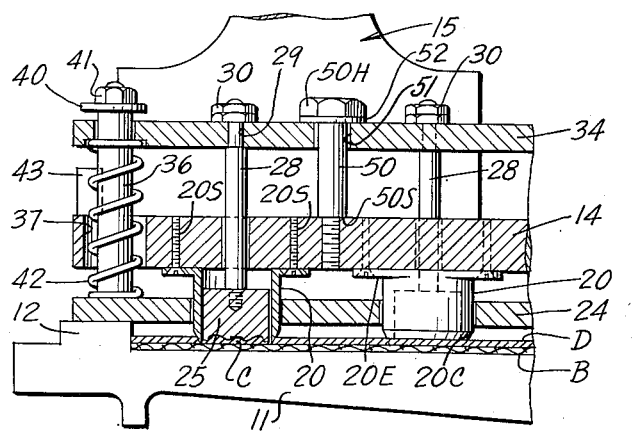

The lower face of the bolster plate 14 serves as a support for a plurality of downwardly extending cutters 20 that are distributed about the lower surface of the bolster plate 14 in spaced relation to the ends and side edges of the plate. The cutters 20 are shaped in plan-form so as to produce crackers or cookies of the desired shape, and as herein shown are generally circular in plan-form. Each cutter 20 has a continuous side wall which at its upper end bears against the lower face of the bolster plate 14, and integral attaching ears 20E extend from the opposite sides of the cutter at the upper edge thereof so that screws 20S extended upwardly through such ears may serve to hold the cutter in position. The lower edge of the wall of each cutter 20 is tapered to a sharp lower cutting edge 20C. Thus when the bolster plate 14 is moved downwardly through its operating stroke, the cutters 20 are effective to cut the dough sheet D to form crackers C, as shown in Fig. 6.

Figure 4:
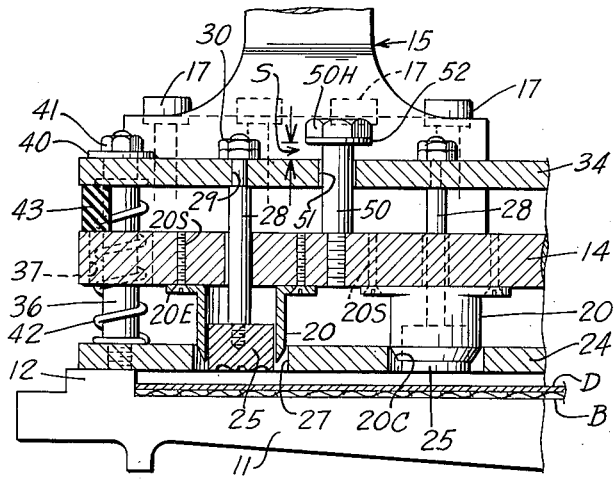
Figs. 4, 5 and 6 are sectional views taken along the line 4—4 of Fig. 2, and showing the parts in different positions.

It is, of course, essential that the dough sheet D and the cut crackers or cookies C be held against upward movement with the cutters 20, and for this purpose a lower stripper plate 24 surrounds the cutters 20. Internal heads 25 are provided within the cutters 20 to serve as embossing heads as will be described hereinafter. The stripper plate 24 is in the form of a rectangular plate of the same shape and size as the bolster plate 14, and openings 27 are formed in the stripper plate 24 through which the respective cutters 20 may extend and move in relatively closely spaced relation. The internal heads 25 which serve as embossing members, as will be hereinafter described, are disposed within the respective cutters 20 in closely spaced relation to the inside surfaces of the walls of the cutters 20. The internal heads 25 under the present invention are supported in a novel and advantageous manner which normally locates their lower surfaces at substantially the level of the lower face of the stripper plate 24, as shown in Fig. 4 and somewhat below the lower edges of the cutters 20.

Figure 3:
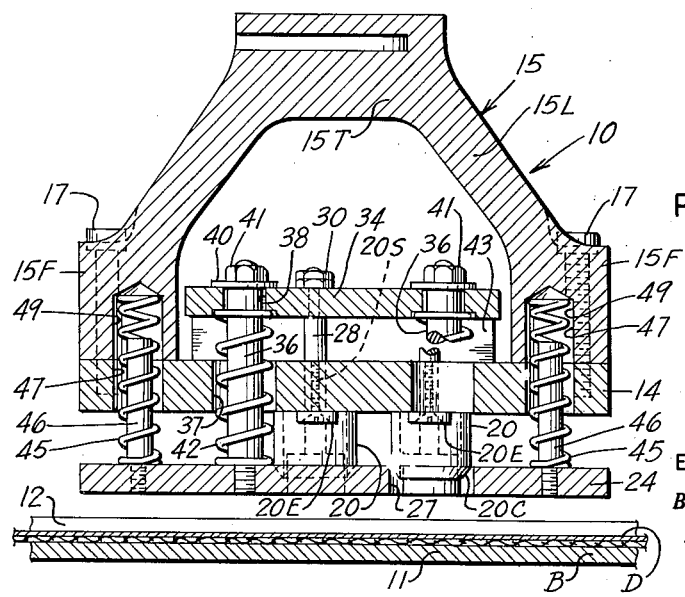
Fig. 3 is a sectional view taken along the line 3—3 of Fig. 1.

The internal heads 25 within the cutters 20 are utilized as embossing members, and have embossing faces 25E on their lower surfaces. Such heads 25 are arranged for embossing movements independently of the stripper plate 24, and all of the heads 25 are operated in unison by mounting the heads 25 rigidly on a single embossing plate 34. This plate 34 is rectangular in form and is of a length equal to that of the bolster plate 14 but is somewhat narrower in width so as to enable it to be disposed between the legs 15L of the arches as shown in Fig. 3. Each head 25 has the reduced and threaded lower end of a stud 28 threaded into the upper face of the head, and the reduced and shouldered upper end of each stud 28 is extended through a mounting bore 29 in the embossing plate 34. The upper shoulder of the stud 28 engages the lower face of the plate 34, and nuts 30 on the upper ends of the studs 28 engage the upper face of the plate 34, so that all of the embossing heads 25 will move in unison with the embossing plate.

Figure 2:
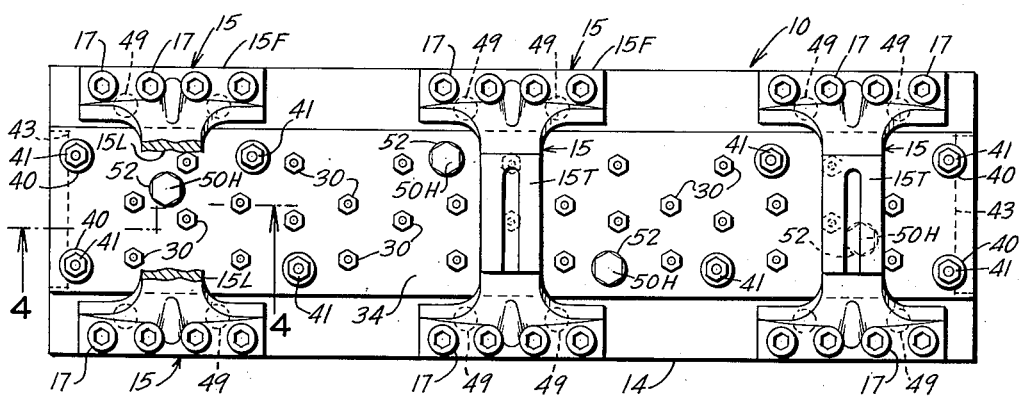
Fig. 2 is a plan view.

Stripper plate 24 is supported beneath the bolster plate 14 for up and down movement relative to the bolster plate 14, and for relative up and down movement relative to the embossing plate 34, and for this purpose a pair of connecting studs 36 at each end of the structure have their lower ends shouldered and threaded into the stripper plate 24, and these studs extend upwardly through relatively large bores 37 in the bolster plate 14. The upper ends of the studs 36 are shouldered and reduced, and are extended through bores 38 in the embossing plate 34, and washers 40 and nuts 41 on the reduced and threaded upper ends of the studs 36 serve to limit downward movement of the stripper plate 24 with respect to the embossing plate 34. Springs 42 surrounding the studs 36 and acting between the plates 24 and 34 tend to urge these plates to their most separated relation as limited by the length of the studs 36. The lowermost position of the stripper plate 24 with respect to the bolster plate 14 is determined by engagement of the plate 34 with resilient bumper strips 43 carried on the upper surface of the bolster plate 14, as shown in Figs. 1, 2 and 3, and the stripper plate 24 is urged downwardly toward this relation by spring means. Thus, as will be evident in Figs. 1 to 3 of the drawings, two expansive coil springs 45 are provided in the area covered by each foot 15F of each arch 15, and these springs 45 are respectively mounted in surrounding relation to guide studs 46 that extend upwardly from the stripper plate 24. In order to afford an efficient length in the springs 45, these springs are extended upwardly through bores 47 in the bolster plate 14 and into bores 49 that extend upwardly into the feet 15F of the arches 15, such bores 47 and 49 affording downwardly facing pockets so that the upper ends of the springs 45 are disposed in part within the feet 15F of the arches 15. The springs 45 act, of course, to urge the stripper plate 24 to the lower relation that is determined by the pads or bumper strips 43.

In the unit 10, the internal heads 25 within the cutters 20 are utilized as embossing members, and such members 25 are, under the present invention, arranged so as to attain an embossing action in each downward stroke of the bolster plate 14.

Figure 5:
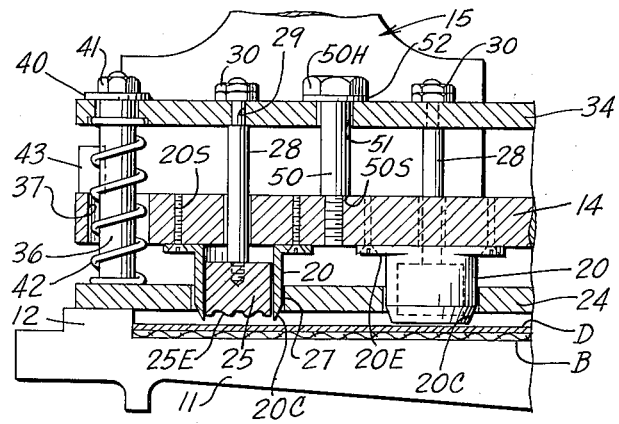

This is accomplished in accordance with the present invention by affording means whereby the bolster plate 14, in its downward stroke, becomes operatively connected to the embossing plate 34 so as to impart downward embossing movement to the embossing plate 34 and to the connected embossing heads 25, and under the present invention this result is attained in such a way that the mechanism may readily be set or adjusted for embossing operation on dough sheets of different thicknesses. Thus a plurality of actuating studs 50 are provided which have their lower ends reduced and screw threaded, and these studs thus afford shoulders 50S at the upper ends of their screw threaded lower portions. These screw threaded lower portions of the studs 50 are threaded into the bolster plate 14 so that the shoulders 50S engage the upper face of the bolster plate 14, and in doing this the studs 50 are extended slidably downwardly through bores 51 in the embossing plate 34 so that integral nut like heads 50H on the studs 50 are disposed above the upper face of the plate 34. For purposes that will appear hereinafter, a separately formed washer 52 of predetermined thickness is disposed about each stud 50 above the embossing plate 34 and beneath the head 50H of the stud as a replaceable motion-transmitting means. The several studs 50 are disposed in positions spaced about the area of the plate 34, thereby to impart downward forces to the plate 34 in a uniform manner. The effective length of the studs 50 is such that when the embossing plate 34 and the stripper plate 24 are in their lowermost or rest relation with respect to the bolster plate 14, that is with the plate 34 engaged with the resilient bumpers 43, the heads 50H of the studs 50 will be spaced upwardly from the embossing plate 34, and the effective spacing is, of course, determined in part by the length of the studs 50 and in part by the thickness of the washers 52. This effective spacing is indicated at S in Fig. 4. When the bolster plate 14 moves downwardly from the position of Figs. 1 and 3, this spacing S remains the same until the stripper plate 24 engages the striker bar 12, and thereafter, the heads 50H of the studs 50 move downwardly relative to the embossing plate 34 till the position or relation of Fig. 5 is reached where the washers 52 engage the plate 34. During this part of the stroke, it is the springs 42 which maintain the plate 34 in its upper relation with respect to the stripper plate 24.

When the parts are positioned as shown in Fig. 5, the lower faces of the heads 25 are so related in a vertical sense with respect to the lower edges of the cutters 20 that an embossing action will be accomplished on the cookies C by the heads 25 as such cookies C are cut by the cutters 20, the cutter 20 and the heads 25 being moved in unison in their cutting and embossing relation of Fig. 5 as the downward stroke of the bolster plate 14 continues to the final downward position of Fig. 6. The attainment of this embossing relation and embossing action is however dependent upon having the proper spacing S for the thickness of the dough sheet D that is being passed through the machine, and under the present invention this relationship may be readily varied while the cutter unit 10 is in the machine. Thus the studs 50 may be readily removed, and a different thickness of washer 52 may be substituted in accordance with the thickness of the dough sheet that is to be used.

With the construction that is thus afforded, the present embossing cutter 10 is effective to not only cut cookies from the dough sheet D, but is also effective to emboss a pattern upon the upper surface of the cookie, and this is attained in the reciprocating movements of the cutter bar 13 without the necessity of providing additional actuating means for imparting movements to the embossing heads.

It will be evident from the foregoing description that with the embossing cutter of the present invention the cutting and embossing operations are attained by utilizing a single-action reciprocating drive mechanism, and hence, through the use of the embossing cutter of the present invention, it is possible to emboss cookies or crackers in a simple cracker or cookie cutting machine. This eliminates the necessity of purchasing a more expensive kind of machine which affords a second or independent drive means for the embossing mechanism. Moreover, under the present invention, the embossing action may readily be obtained with dough sheets of different thicknesses, and the adjustments or changes required for dough sheets of different thicknesses may be made while the cutter unit remains in position in the machine. It will be clear, therefore, that the present invention materially extends the usefulness of cracker and cookie cutting machines, and in addition to this, it will be evident that the present invention is extremely simple in character so that the manufacture and upkeep of the cutter is rendered more economical.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claim.

I claim:

In a cutting and embossing unit of the character described, a bolster block, hollow cutters fixed to the lower face of said bolster block, a stripper plate disposed beneath said bolster block and having openings through which said cutters extend, an embossing plate mounted above said bolster block for vertical movement relative thereto, spring means urging said embossing plate upwardly relative to said stripper plate, positive stop means limiting such relative upward movement of said embossing plate by said spring means, resilient bumper means effective between said bolster block and said embossing plate to limit relative downward movement of said stripper plate, spring means acting to urge said stripper plate downwardly relative to said bolster block, embossing blocks disposed within the respective cutters for movement vertically within and with respect to said cutters, means rigidly connecting the respective embossing blocks to said embossing plate, and a plurality of headed studs extended slidably downwardly through said embossing plate and threaded into said bolster block so that said heads engage said embossing plate to move said embossing plate downwardly with said embossing blocks in an embossing relation to said cutters.

EDWARD A. WEIDENMILLER.

REFERENCES CITED

The following references are of record in the file of this patent:

UNITED STATES PATENTS

| Number | Name | Date |
| --- | --- | --- |
| 2,153,067 | Alltimes | Apr. 4, 1939 |